United States Patent [19]
Lai

[11] Patent Number: 5,983,562
[45] Date of Patent: Nov. 16, 1999

[54] BEAN SPROUT CULTURE BOX ASSEMBLY

[76] Inventor: Wen-Chi Lai, No. 1, Lane 197, Tzu Chiang S. St., Feng Yuan City, Taichung Hsien, Taiwan

[21] Appl. No.: 08/887,121

[22] Filed: Jul. 2, 1997

[51] Int. Cl.$^6$ ........................................ A01G 31/00
[52] U.S. Cl. ........................................ 47/61; 47/60
[58] Field of Search ........................ 47/61, 60, 69, 47/65.5

[56] References Cited

U.S. PATENT DOCUMENTS

| | | | |
|---|---|---|---|
| 4,006,557 | 2/1977 | Sawyer | 47/61 |
| 4,057,930 | 11/1977 | Barham | 47/61 |
| 4,180,941 | 1/1980 | Korematsu | 47/61 |
| 4,224,765 | 9/1980 | Song | 47/65.5 |
| 4,249,341 | 2/1981 | Huegli | 47/61 |
| 4,471,572 | 9/1984 | Young | 47/61 |

*Primary Examiner*—Michael J. Carone
*Assistant Examiner*—Joanne C. Downs
*Attorney, Agent, or Firm*—Bacon & Thomas, PLLC

[57] ABSTRACT

A bean sprout culture box assembly includes a water carrying plate defining an overflow port in one side wall thereof. A transparent box is supported on the water carrying plate and includes four side walls and a bottom portion. A plurality of vent holes are defined in each of the side walls of the transparent box, and a plurality of draining holes are defined in the bottom portion of the transparent box. A net plate is received in the transparent box and is supported on the bottom portion thereof, and a plurality of meshes are defined in the net plate and communicate with the draining holes. A transparent hood is mounted on an upper portion of the transparent box, and a plurality of vent ports are defined in the transparent hood.

6 Claims, 6 Drawing Sheets

5,983,562

BEAN SPROUT CULTURE BOX ASSEMBLY

FIELD OF THE INVENTION

The present invention relates to a bean sprout culture box assembly.

BACKGROUND OF THE INVENTION

A conventional bean sprout culture box assembly is shown in FIGS. 7 and 8, and a complete illustration will follow in the detailed description of the preferred embodiments.

The present invention has arisen to mitigate and/or obviate the disadvantages of the conventional bean sprout culture box assembly.

SUMMARY OF THE INVENTION

In accordance with one aspect of the present invention, there is provided a bean sprout culture box assembly comprising a water carrying plate defining an overflow port in one side wall thereof.

A transparent box is supported on the water carrying plate and includes four side walls and a bottom portion. A plurality of vent holes are defined in each of the side walls of the transparent box, and a plurality of draining holes are defined in the bottom portion of the transparent box.

A net plate is received in the transparent box and is supported on the bottom portion thereof, and a plurality of meshes are defined in the net plate and communicate with the draining holes.

A transparent hood is mounted on an upper portion of the transparent box, and a plurality of vent ports are defined in the transparent hood.

Further features of the present invention will become apparent after a careful reading of the detailed description with appropriate reference to the accompanying drawings.

DETAILED DESCRIPTION OF THE PREFERRED EMBODIMENTS

Figure 7:
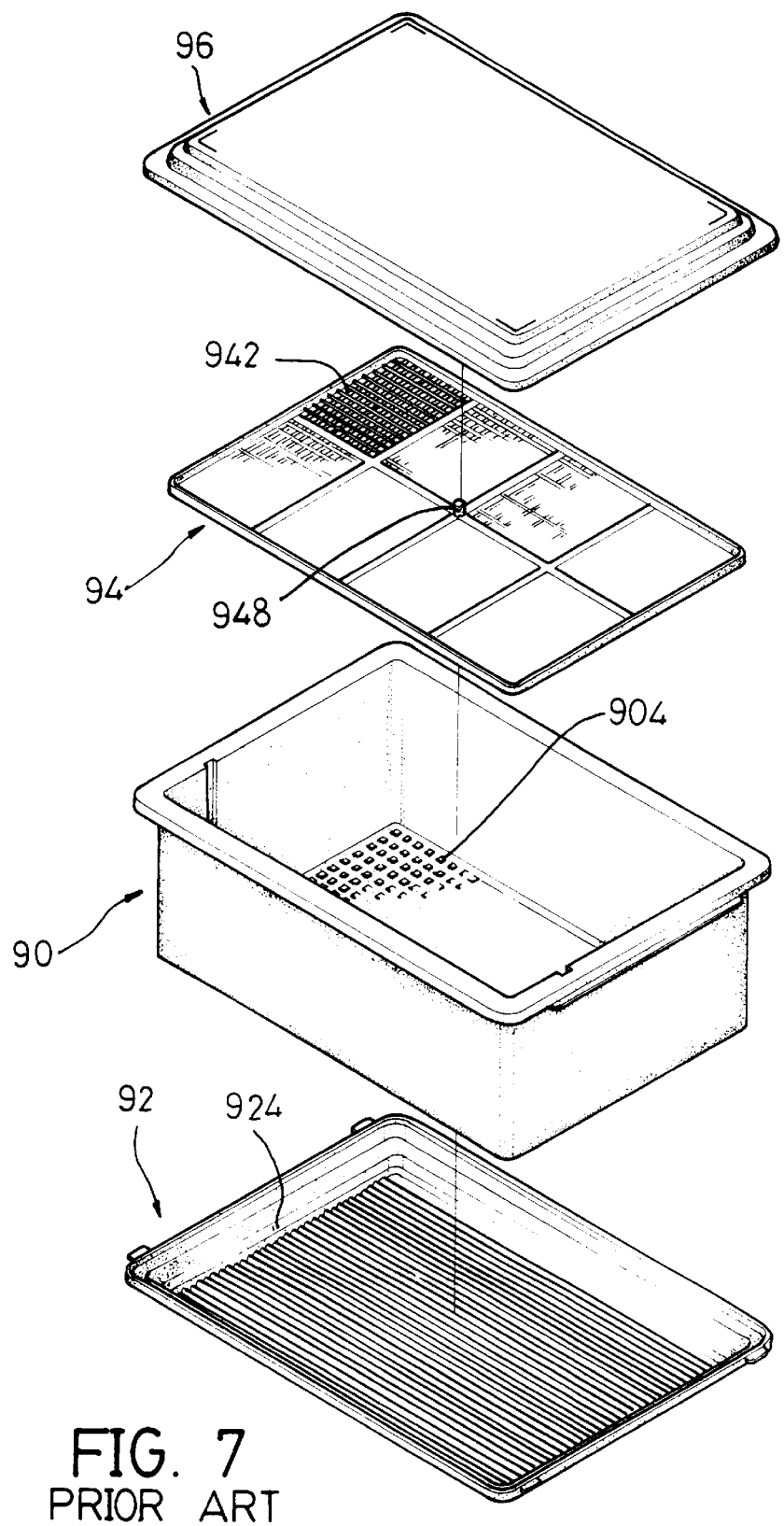
FIG. 7 is an exploded view of a conventional bean sprout culture box assembly according to the prior art.
Figure 8:
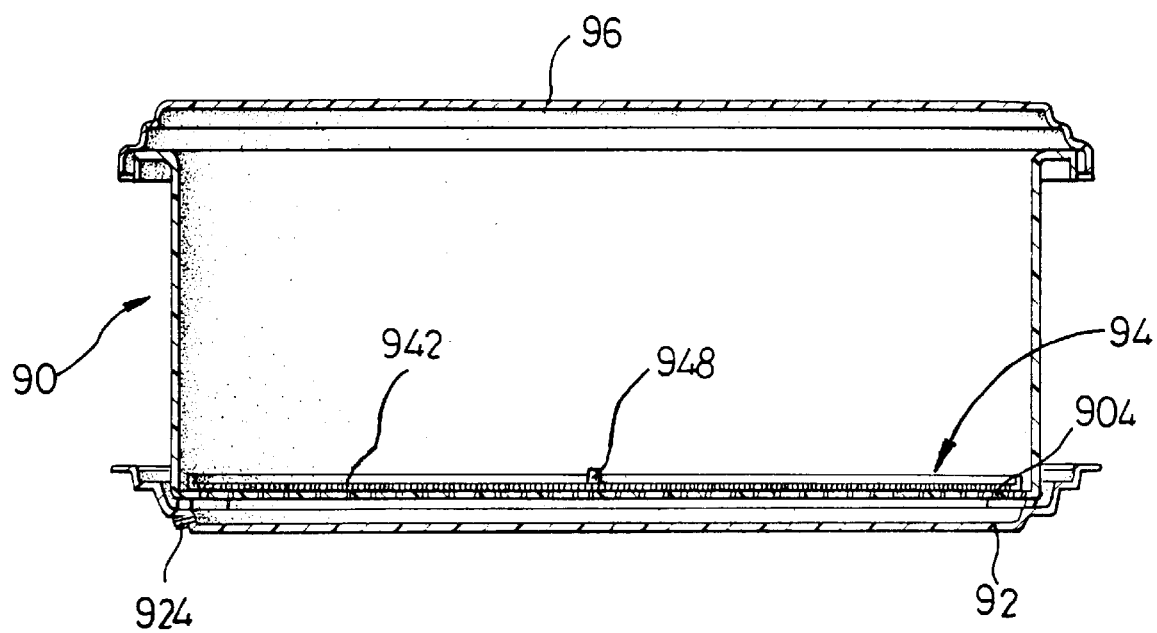
FIG. 8 is a front plan cross-sectional assembly view of FIG. 7.

For a better understanding of the features and benefits of the present invention, reference is now made to FIGS. 7 and 8 illustrating a conventional bean sprout culture box assembly according to the prior art.

The conventional bean sprout culture box assembly comprises a water carrying plate 92 defining an overflow port 924 in one side thereof, an opaque box 90 supported on the water carrying plate 92 and defining a plurality of draining holes 904 in a bottom portion thereof, a plastic net plate 94 received in the box 90 and defining a plurality of meshes 942 therein, a handgrip 948 formed on a center of the net plate 94 and an opaque hood 96 mounted on an upper portion of the box 90.

By such an arrangement, however, the conventional bean sprout culture box assembly the following disadvantages:

(1) The hood 96 together with the box 90 form a closed space, thereby greatly decreasing the ventilation in the box 90 such that bean sprouts (not shown) supported on the net plate 94 easily mold or even decompose during a cultivating process.

(2) The opaque hood 96 and box 90 are impermeable to light such that the bean sprouts in the box 90 cannot be used to create chlorophyll by proceeding in photosynthesis during the cultivating process, thereby greatly decreasing the content of chlorophyll in the bean sprouts which easily become yellow and contain little nutrition therein.

(3) Each of the meshes 942 of the plastic net plate 94 has a great depth such that it is not easy to remove dust, moss or bean seeds clogged in the meshes 942, thereby causing a difficulty for cleaning the net plate 94. In such a situation, a user has to violently hit the net plate 94 on the ground so as to remove the bean seeds and the like clogged thereon, thereby easily breaking the net plate 94.

(4) The overflow port 924 of the water carrying plate 92 is disposed at a low level such that an amount of water contained in the water carrying plate 92 is small and cannot provide sufficient water for growing the bean sprouts.

(5) The net plate 94 directly touching the bean sprouts is made of integrally injection molding plastics which easily release toxin to the bean sprouts during the cultivating process, thereby greatly impairing a eater's health.

Figure 1:
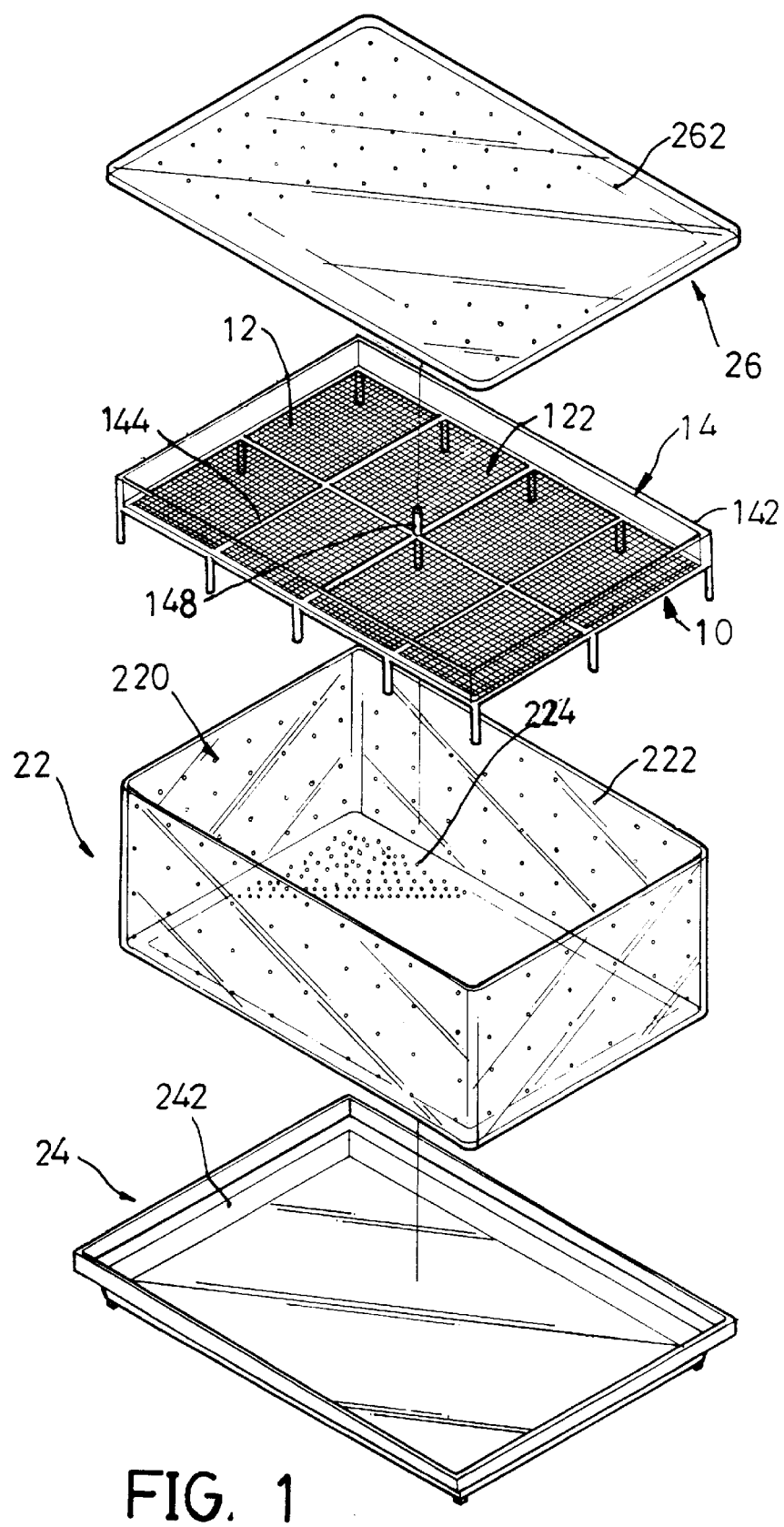
FIG. 1 is an exploded view of a bean sprout culture box assembly according to the present invention.
Figure 2:
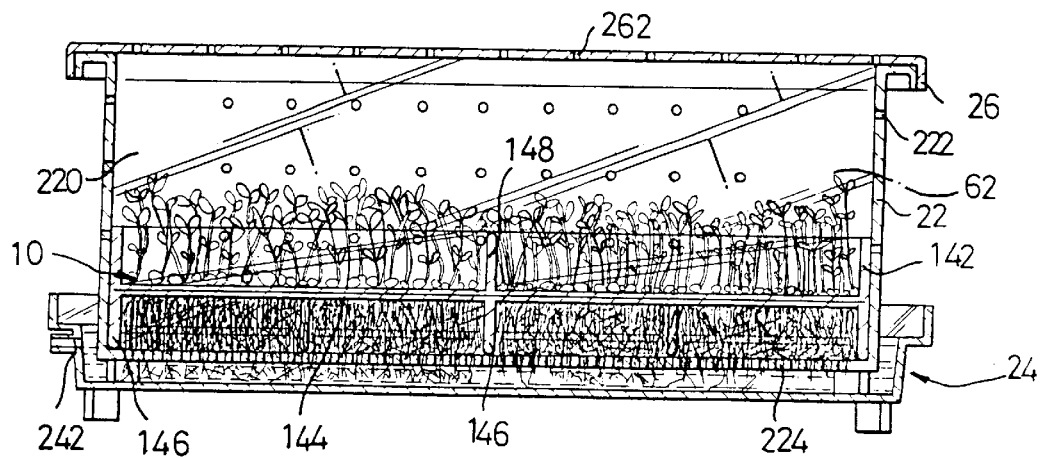
FIG. 2 is a front plan cross-sectional assembly view of FIG. 1.

Referring now to FIGS. 1 and 2, a bean sprout culture box assembly according to the present invention comprises a water carrying plate 24 for receiving water therein, and an overflow port 242 defined in one side wall of the water carrying plate 24 for draining water.

A substantially rectangular transparent box 22 is supported on the water carrying plate 24 and includes four side walls and a bottom portion. A plurality of vent holes 222 are defined in each of the side walls of the transparent box 22, and a plurality of draining holes 224 are defined in the bottom portion of the transparent box 22 for draining water into the water carrying plate 24.

A net plate 10 is received in a chamber 224 defined in the transparent box 22 and is supported on the bottom portion of the transparent box 22.

A transparent hood 26 is mounted on an upper portion of the transparent box 22, and a plurality of vent ports 262 are defined in the transparent hood 26 and each communicate with the chamber 220.

Figure 3:
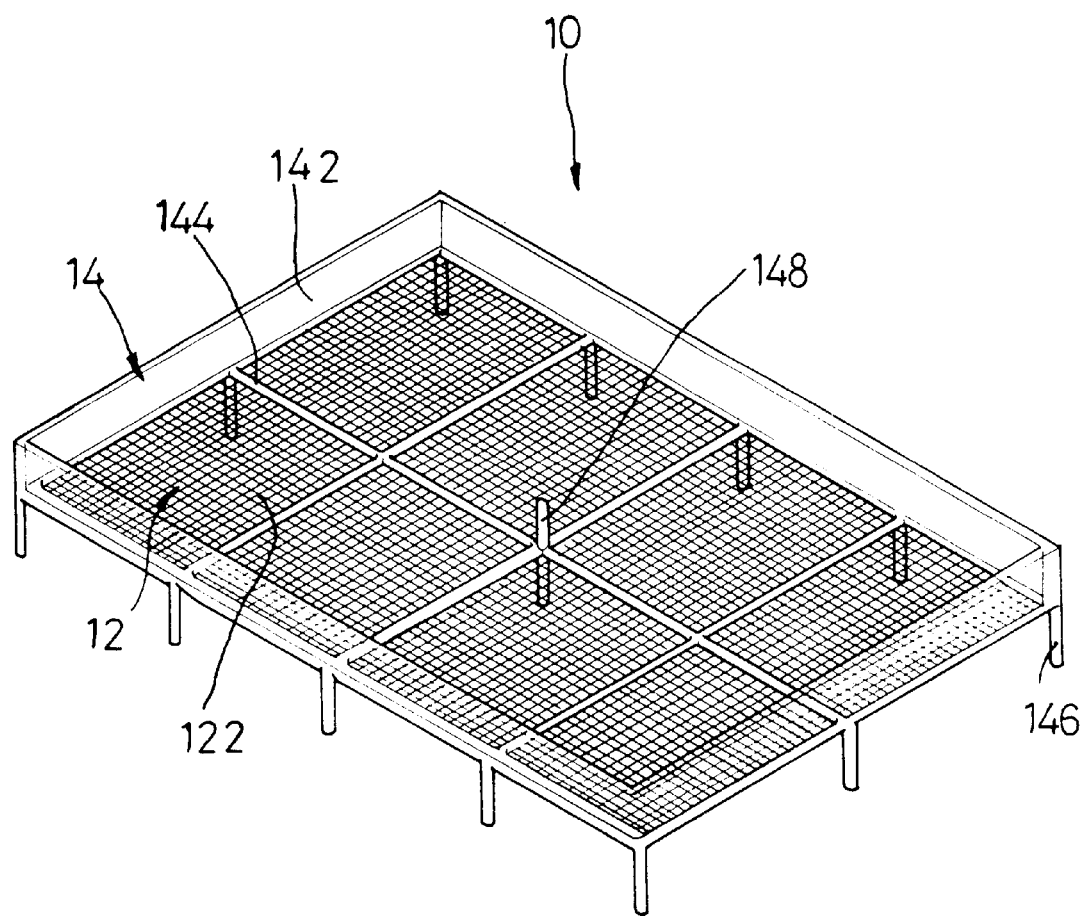
FIG. 3 is a perspective view of a net plate.
Figure 4:
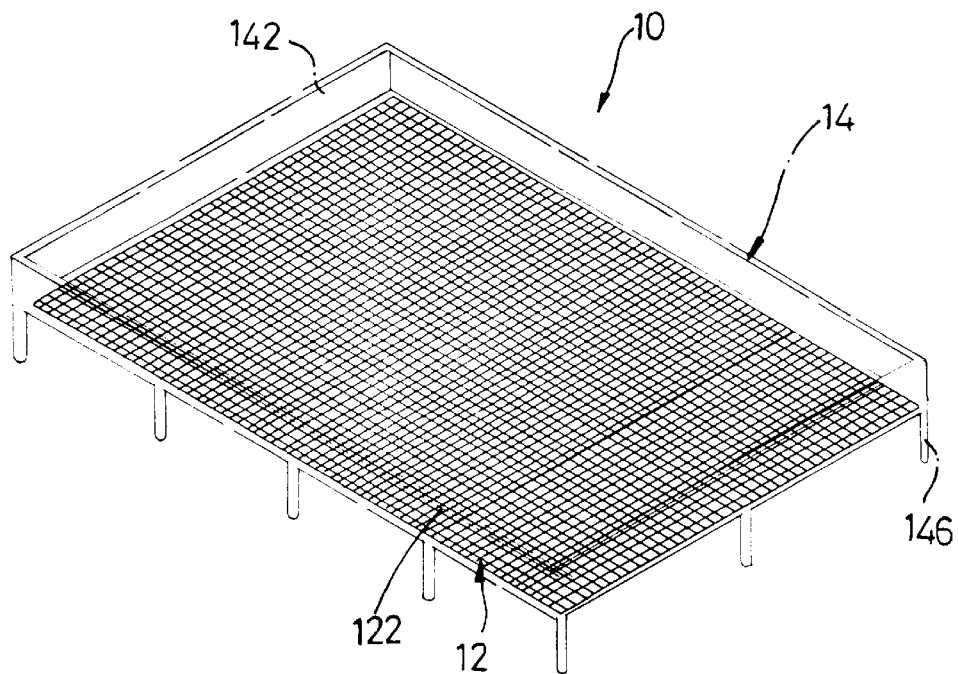
FIG. 4 is a partially perspective view of the net plate.
Figure 5:
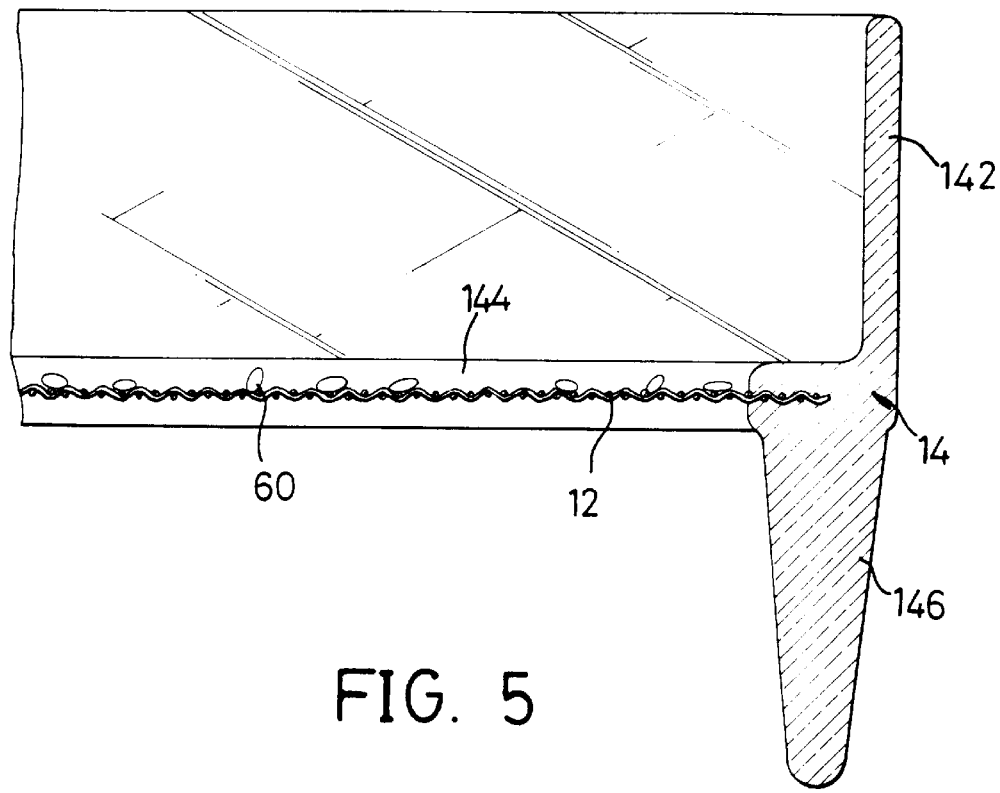
FIG. 5 is a partially front plan cross-sectional view of FIG. 3.

Referring to FIGS. 3–5 with reference to FIGS. 1 and 2, the net plate 10 includes a metallic net sheet 12 defining a plurality of meshes 122 each communicating with the draining holes 224, and a rectangular plastic frame 14 integrally coated on an outer periphery of the metallic net sheet 12.

The rectangular plastic frame 14 is integrally formed with four vertical baffles 142 enclosing the metallic net sheet 12 for preventing bean seeds 60 (see FIG. 5) supported on the meshes 122 of the net sheet 12 from escaping.

The plastic frame 14 is also integrally formed with a plurality of intersecting reinforcing ribs 144 each coated on the metallic net sheet 12 for reinforcing the structure of the plastic frame 14.

A handgrip 148 is integrally formed a center of the reinforcing ribs 144, thereby facilitating a user to take the net plate 10 from the box 22.

The plastic frame 14 includes a plurality of supporting legs 146 integrally formed on an underside thereof each supported on the bottom portion of the transparent box 22.

Each of the supporting legs 146 has a height greater than a level of the overflow port 242 such that bean sprouts 62 (see FIG. 2) cultivated from the bean seeds 60 can be disposed above the overflow port 242, thereby preventing the beans sprouts 62 from being immersed into the water in the water carrying plate 24.

Figure 6:
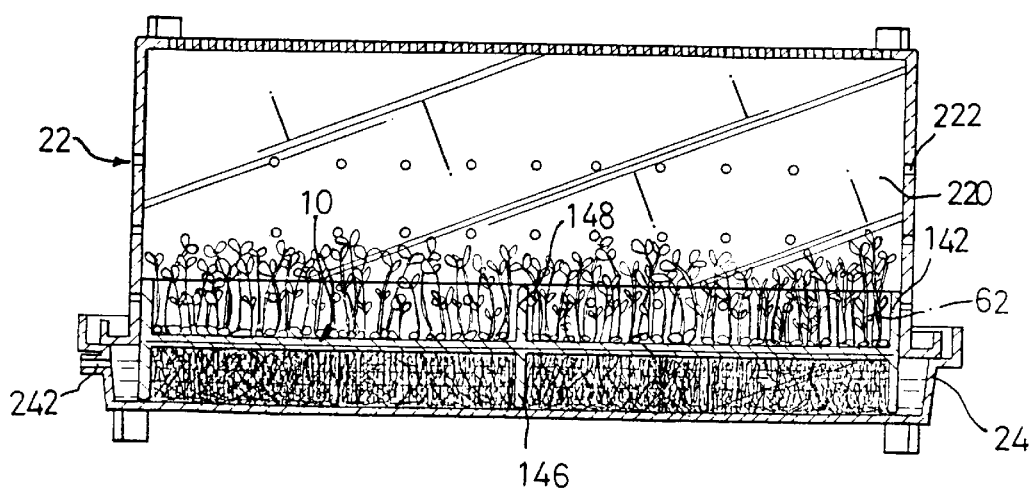
FIG. 6 is a front plan cross-sectional view of the bean sprout culture box assembly according to another embodiment of the present invention.

Referring now to FIG. 6, in accordance with another embodiment of the present invention, the hood 26 can be removed and the box 22 can be inverted to be supported on the water carrying plate 24 for covering the net plate 10.

By such an arrangement, the bean sprout culture box assembly in accordance with the present invention can be adapted to provide the following advantages:

(1) The vent ports 262 of the hood 26 and the vent holes 222 of the box 22 can be used to efficiently maintain the box 22 in an excellent ventilation, thereby preventing the bean sprouts 62 from molding or even decomposing during the cultivating process.

(2) The transparent hood 26 and the transparent box 22 are permeable to light such that the bean sprouts 62 can be used to proceed in photosynthesis so as to create chlorophyll during the cultivating process.

(3) Each of the meshes 122 of the metallic net sheet 12 has a small depth such that it is easy to remove dust, moss or the bean seeds 60 clogged in the meshes 122, thereby efficiently cleaning the net sheet 12.

It should be clear to those skilled in the art that further embodiments of the present invention may be made without departing from the scope and spirit of the present invention.

What is claimed is:

1. A bean sprout culture box assembly comprising:

a water carrying plate (24) defining an overflow port (242) in one side wall thereof;

a transparent box (22) supported on said water carrying plate (24) and including four side walls and a bottom portion, a plurality of vent holes (222) defined in each of said side walls of said transparent box (22), and a plurality of draining holes (224) defined in said bottom portion of said transparent box (22);

a net plate (10) received in said transparent box (22) and supported on said bottom portion thereof, and a plurality of meshes (122) defined in said net plate (10) and communicating with said draining holes (224); and a transparent hood (26) mounted on an upper portion of said transparent box (22), and a plurality of vent ports (262) defined in said transparent hood (26).

2. The bean sprout culture box assembly in accordance with claim 1, wherein said net plate (10) includes a metallic net sheet (12) defining said plurality of meshes (122), and a plastic frame (14) integrally coated on an outer periphery of said metallic net sheet (12).

3. The bean sprout culture box assembly in accordance with claim 2, wherein said plastic frame (14) is rectangular and is integrally formed with four baffles (142) enclosing said metallic net sheet (12).

4. The bean sprout culture box assembly in accordance with claim 2, wherein said plastic frame (14) includes a plurality of supporting legs (146) integrally formed on an underside thereof each supported on said bottom portion of said transparent box (22).

5. The bean sprout culture box assembly in accordance with claim 4, wherein each of said supporting legs (146) has a height greater than a level of said overflow port (242).

6. The bean sprout culture box assembly in accordance with claim 2, wherein said plastic frame (14) is formed with a plurality of intersecting reinforcing ribs (144) each coated on said metallic net sheet (12).

* * * * *